United States Patent [19]

Gill

[11] Patent Number: 5,047,078
[45] Date of Patent: Sep. 10, 1991

[54] METHOD AND COMPOSITIONS FOR INCREASING PLANT GROWTH

[75] Inventor: Jasbir S. Gill, Coraopolis, Pa.

[73] Assignee: Calgon Corporation, Pittsburgh, Pa.

[21] Appl. No.: 729,838

[22] Filed: May 2, 1985

[51] Int. Cl.$^5$ .................... C05G 3/00; C05B 21/00
[52] U.S. Cl. ................................. 71/11; 71/27; 71/34
[58] Field of Search ..................... 71/34, 27, 11

[56] References Cited

U.S. PATENT DOCUMENTS 4,185,988 1/1980 Kistler et al. ........................ 71/27
4,315,762 2/1982 Evrard ................................. 71/27

FOREIGN PATENT DOCUMENTS

WO85/01938 5/1985 PCT Int'l Appl.

OTHER PUBLICATIONS

Azzam, R. A. I. (Nucl. Res.Cent..., Inshas, Egypt), Report 1983, IAEA-R-2596-F, 24 pp. (Eng).

Primary Examiner—Ferris H. Lander
Attorney, Agent, or Firm—W. C. Mitchell; M. C. Sudol; R. B. Olson

[57] ABSTRACT

This invention relates to the use of traditional scale inhibitors as fertilizers enhancers. More particularly, this invention relates to compositions which comprise: (a) a phosphate fertilizer and (b) a scale inhibiting compound. Further, this invention relates to a method of stimulating and increasing plant growth, and corresponding yields, comprising adding the above-defined compositions to the soil in which the plants being treated grow.

6 Claims, No Drawings

METHOD AND COMPOSITIONS FOR INCREASING PLANT GROWTH

BACKGROUND OF THE ART

This invention relates to the use of traditional scale inhibitors as fertilizer enhancers. More particularly, this invention relates to compositions which comprise: (a) a phosphate fertilizer and (b) a scale inhibiting compound. These compositions greatly stimulate plant growth. Further, this invention relates to a method of stimulating and increasing plant growth, and corresponding yields, comprising adding the above-defined compositions to the soil in which the plants being treated grow.

As used herein, the term "scale inhibiting compound" is defined as any compound which inhibits the precipitation of scale forming salts in aqueous systems. Scale forming salts include, but are not limited to, calcium carbonate, calcium sulfate, calcium phosphate, calcium phosphonate, calcium oxalate, calcium fluoride, barium sulfate and magnesium salts.

As used herein, the term "fertilizer" is defined as a material or combination of materials which is added to soil to improve the rate of growth or health of plants, or the yield of plant fruits.

Fertilizers are added to soils to enrich or replenish chemical nutrients in the soil which are vital to plant growth. A soil may be naturally lacking in a needed chemical nutrient, or the deficiency may be due to the taking of chemicals by crops previously grown. In either case, the use of fertilizers increases productivity, as measured by ratios such as yield per acre, or yield per man hour. Additionally, the use of fertilizers enables soil to be used continuously, since artificial addition of needed components to nutrient depleted soils replaces natural replenishment of these components through fallow.

The fact that crops deplete key chemical elements from soil is well known. Generally, plants obtain all nutrients from soil, with the exception of carbon, oxygen and hydrogen. Typical soil-based nutrients essential to plant growth include, but are not limited to, nitrogen, silicon, magnesium, oxides of iron and calcium, chlorides, sulfates, magnesia, phosphates, soda and potash. Accordingly, typical fertilizers include: nitrogen fertilizers, such as sodium nitrate ($NaNO_3$), ammonium sulfate ($(NH_4)_2SO_4$), calcium nitrate ($(CaNO_3)_2$), ammonium nitrate ($NH_4NO_3$), urea ($CO(NH_2)_2$), and liquid nitrogen fertilizers, including anhydrous ammonia and aqua ammonia; phosphate fertilizers, such as apatites ($Ca_5(PO_4)_3R$, wherein R is OH, $CO_3$, Cl or F), inorganic polyphosphates, tricalcium phosphate ($Ca_3(PO_4)_2$), dicalcium phosphate ($CaHPO_4$), monocalcium phosphate ($Ca(H_2PO_4)_2$, also called single super phosphate), iron phosphates, aluminum phosphates, orthophosphoric acid and nitrophosphates; potassium fertilizers, such as potassium sulfate ($K_2SO_4$), and potassium nitrate ($KNO_3$), potassium chloride and potash; and combinations of nitrogen, phosphate and potassium fertilizers which, according to traditional fertilizer nomenclature, are designated as percent N-percent $P_2O_5$-percent $KO_2$. Thus, many combinations are possible. For example, typical products are 20-20-0, 15-15-15, 10-34-0, 13-13-13, 12-57-0, 28-28-0, and 19-19-19. Additionally, secondary nutrients may be added to fertilizer compositions as required. Secondary nutrients include, but are not limited to, boron, copper, iron, manganese, molybdenum, zinc and magnesium.

As used herein, soil refers to the surface layer of the earth in which plants grow. This definition encompasses all types of soil, including but not limited to sandy soil, clay soils, topsoils and the like.

In accordance with the instant invention, it has been found that the addition of scale inhibiting compounds to soil, in conjunction with phosphate fertilizers, greatly enhances the effectiveness of said phosphate fertilizers. This novel use of scale inhibiting compounds produces extraordinary and unexpected results in terms of plant growth; thus, benefits associated with the instant invention include, but are not limited to, higher yield per acre, higher yield per man hour, higher yield per pound of fertilizer and reduced fertilizer consumption.

The key to this invention relates to the availability of fertilizer nutrients to plants. It is estimated that a maximum of approximately 20 percent of a fertilizer added to soil becomes available to plants. For example, it is known that a major portion of phosphate fertilizers precipitate as insoluble inorganic salts such as calcium phosphate, zinc phosphate, or salts of phosphate and other ions present in the soil. These precipitated, insoluble salts are of limited value to plants. It is also known that the type of soil used and soil pH effect the availability of specific fertilizers to plants. The scale inhibitors of the instant invention, when added to fertilizers, inhibit the precipitation of insoluble inorganic salts which occurs when the fertilizer dissolves in water, from irrigation or rain, and contacts ions present in the soil. By inhibiting precipitation of these insoluble salts, more fertilizer becomes available to the plants. Additionally, other nutrients, such as zinc ions, become available to the plants.

Scale inhibitors which have efficacy as fertilizer enhancers include, but are not limited to, phosphonates, sulfonates and polymers of ethylenically unsaturated carboxylic acids, and their salts, alone or in combination.

Though it is well known in the art to use scale inhibitors to prevent the precipitation of salts in aqueous systems, the novel use, compositions and process of the instant invention are not known in the art.

DESCRIPTION OF THE INVENTION

The instant invention is directed to a method of enhancing the efficacy of a phosphate fertilizer, comprising adding an effective amount of a scale inhibiting compound to said fertilizer. The instant invention is further directed to an improved fertilizer composition, comprising: (a) a phosphate fertilizer and (b) a scale inhibiting compound. The instant invention is additionally directed to a method of improving the rate of growth, yield and health of plants comprising adding to the soil in which said plants are growing, separately or in combination, (a) a phosphate fertilizer and (b) a scale inhibiting compound. Additionally, use of the instant scale inhibiting compounds increases the availability of cations in the soil or in the fertilizer which are useful as plant nutrients. These cations include, but are not limited to, zinc, calcium, barium and magnesium.

Any phosphate fertilizer can be used with respect to the instant invention. The term "phosphate fertilizer", as used herein, includes all fertilizers containing a source of phosphate ions.

Any scale inhibitor can be used in the instant invention. For example, preferred scale inhibitors are water soluble and include those selected from the group consisting of phosphonates, sulfonates, and water soluble polymers of unsaturated carboxylic acids and salts thereof, alone or in combination.

Any water-soluble phosphonate may be used as component ((a). Examples include 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid, polyamino phosphonates and the like. Additional phosphonates, which are identified in U.S. Pat. No. 3,837,803, are hereby incorporated by reference. The preferred phosphonates are 2-phosphono-1,2,4-tricarboxybutane, amino tri(methylene phosphonic acid) and 1-hydroxyalkylidene-1,1-diphosphonic acids of the formula HO-P-C-P-OH, wherein R denotes an alkyl group having from 1 to 5 carbon atoms. Salts of these organophosphonic acids may also be used. Specific examples of these preferred organophosphonic acids include 1-hydroxyethylidene-1,1-diphosphonic acid (HEDP) and its sodium salt.

Preferred water soluble polymers of unsaturated carboxylic acids include polymers prepared from monomers selected from the group consisting of: acrylic acid, methacrylic acid, alpha-halo acrylic acid, maleic acid or maleic anhydride, itaconic acid, vinyl acetic acid, allyl acetic acid, fumaric acid, crotonic acid, cinnamic acid, vinyl benzoic acid and $\beta$-carboxyethyl acrylate, alone or in combination, and salts thereof.

Additionally, polymers made from (1) any of the above listed unsaturated carboxylic monomers and (2) acrylamide; methacrylamide; hydroxy alkyl esters of acrylic acid; hydroxy alkyl esters of methacrylic acid; unsaturated sulfonic acid monomers selected from the group consisting of: 2-acrylamido-2-methylpropyl sulfonic acid, 2-methacrylamido-2-methylpropyl sulfonic acid, vinyl sulfonic acid, sulfoalkyl acrylate, sulfoalkylmethacrylate, allyl sulfonic acid, methallyl sulfonic acid, 3-methacrylamido-2-hydroxypropyl-sulfonic acid, and sulfonic acid acrylate; 2-acrylamido-2-methyl propyl phosphonic acid; 2-methacrylamido-2-methyl propyl phosphonic acid; ethoxylated ethers of allyl or methallyl alcohols; propoxylated ethers of allyl or methallyl alcohols; ethoxylated esters of acrylic acid or methacrylic acid; propoxylated esters of acrylic acid or methacrylic acid; ethylene oxide/propylene oxide copolymers having polyether side chains; allyl polyethylene oxides; polyethylene glycol monomethacrylate; dimethyl diallyl ammonium chloride; or diethyl diallyl ammonium chloride; alone or in combination, can be used.

Examples of preferred scale inhibiting polymers include those selected from the group consisting of: polyacrylates; polymethacrylates; polymers of acrylic acid and methacrylic acid; polymers of acrylic acid or methacrylic acid and acrylamide or methacrylamide; hydrolyzed polyacrylamides; polymers of acrylic acid or methacrylic acid and maleic acid or anhydride; polymers of maleic acid or maleic anhydride; polymers of acrylic acid or methacrylic acid and hydroxy alkyl acrylate or hydroxyalkyl methacrylate, especially copolymers of methacrylic acid or acrylic acid and hydroxyethyl acrylate or hydroxy ethyl methacrylate and copolymers of methacrylic acid or acrylic acid and hydroxy propyl acrylate or hydroxy propyl methacrylate; homopolymers of sulfonated polystyrene; polymers prepared using sulfonated styrene monomers in combination with monomers selected from the group consisting of maleic acid or maleic anhydride, acrylic acid, and methacrylic acid; terpolymers of acrylic acid, dimethyl diallyl ammonium chloride (DMDAAC) or diethyl diallyl ammonium chloride (DEDAAC), and acrylamide; terpolymers of acrylic acid, DMDAAC or DEDAAC and hydroxy propyl methacrylate; terpolymers of methacrylic acid, DMDAAC or DEDAAC and hydroxy propyl methacrylate; terpolymers of acrylic acid, 2-acrylamido methyl propyl sulfonic acid and allyl polyethylene oxide; and terpolymers of acrylic acid, 2-acrylamido-2-methyl propyl sulfonic acid and polyethylene glycol monomethacrylate.

Any water soluble sulfonate can be used as component ((b). Preferred sulfonates include 2-acrylamido-2-methylpropylsulfonic acid, 2-methacrylamido-2-methylpropylsulfonic acid, vinyl sulfonic acid, sulfoalkylacrylate or methacrylate, allylsulfonic acid, methallylsulfonic acid, 3-methacrylamido-2-hydroxypropylsulfonic acid, sulfonic acid acry.late, and their salts, and mixtures thereof.

The most preferred scale inhibiting compounds are those selected from the group consisting of: 1-hydroxyalkylidene-1,1-diphosphonic acid, copolymers of acrylic acid and 2-acrylamido-2-methylpropyl sulfonic acid (AMPS) or 2-meth-acrylamido-methylpropyl sulfonic acid (MAMPS), wherein the monomer ratio is 1:50 to 50:1, copolymers of methacrylic acid and AMPS or MAMPS, wherein the monomer weight ratio is 50:1 to 1:50, copolymers of acrylic acid and hydroxy alkylacrylate, copolymers of methacrylic acid and hydroxy alkylacrylate, copolymers of acrylic acid and maleic acid or maleic anhydride, copolymers of methacrylic acid and maleic acid or maleic anhydride, other polymers prepared from acrylic acid, methacrylic acid, maleic acid or maleic anhydride, and hydroxy alkylacrylate, alone or in combination.

An effective amount of a scale inhibiting compound should be added to the fertilizer for one-step application of the fertilizer/scale inhibitor composition, or these components can be added separately to the soil. The term 'effective amount' means that quantity of scale inhibiting compound which, when added to soil, aids in preventing the formation and precipitation of insoluble salts in the soil under growing conditions. Generally, at least 0.001 part scale inhibitor must be added for each part fertilizer, by weight. The ratio of scale inhibitor to fertilizer may be as high as 1000:1, on a weight basis. The preferred ratio of scale inhibitor to fertilizer ranges from 100:1 to 1:100; on a weight basis. The most preferred ratio ranges from 10:1 to 1:10, on a weight basis. Based on the soil being treated, the instant scale inhibitors should be added at a dosage of at least 0.1 ppm, based on total dry soil weight, preferably 0.1 ppm–100 ppm.

The molecular weight of the instant scale inhibiting polymers is not critical. It is preferred however that the scale inhibitors have molecular weights in excess of 500, as determined by light scattering techniques. More preferably, these scale inhibitors have molecular weights ranging from 500–100,000, as determined by light scattering techniques. Most preferable, the molecular weights range from 500–25,000.

The instant phosphate fertilizers and scale inhibiting compounds may be added to the soil in combination or separately.

Any technique of application commonly known and used in the art can be utilized. For example, dry compositions of fertilizer and scale inhibitor can be mixed and applied directly to the soil, liquid compositions of the scale inhibitor and fertilizer can be prepared by diluting each component in an aqueous solution and combining, or the scale inhibitor and fertilizer can be added to the soil separately by any suitable means.

The amount of scale inhibitor added to the soil depends on the amount of phosphate fertilizer added to the soil, which in turn is defined by soil conditions. Thus, based on soil deficiencies, a fertilizer is chosen. An effective amount of a scale inhibitor is then added to the soil, either separately or in combination with the chosen fertilizer.

The instant scale inhibitors are especially effective enhancers of phosphate fertilizers. The inventor has discovered that scale inhibiting compounds increase the availa-bility of phosphorus ions in soil for root uptake by plants. The resulting increased uptake of phosphorus ions by plants greatly improves their growth without increasing fertilizer dosages. The most preferred composition comprises a phosphate fertilizer and a scale inhibitor selected from the group consisting of HEDP, copolymers of acrylic acid and 2-acrylamido-2-methylpropyl sulfonic acid (AMPS) or 2-methacrylamido-2-methylpropyl sulfonic acid (MAMPS), wherein the monomer ratio is 1:50 to 50:1, copolymers of methacrylic acid and AMPS OR MAMPS, wherein the monomer weight ratio is 50:1 to 1:50, copolymers of acrylic acid and hydroxy alkylacrylate, copolymers of methacrylic acid and hydroxyalkylacrylate, copolymers of acrylic acid and maleic acid or maleic anhydride, copolymers of methacrylic acid and maleic acid or maleic anhydride, and other polymers prepared from acrylic acid, methacrylic acid, maleic acid or maleic anhydride, and hydroxy alkylacrylate, alone or in combination.

Additionally, the instant scale inhibiting compounds increase the availability of other plant nutrients, including but not limited to boron, copper, iron, manganese, molybdenum, zinc and magnesium.

The term 'synergistic', as used herein, means that the effectiveness of a composition comprising a phosphate fertilizer and a scale inhibitor is substantially greater than the sum of the fertilizer efficacy alone with that of the scale inhibitor alone.

EXAMPLES

The following examples further illustrate the instant invention. These examples should not be construed as narrowing or limiting the instant invention in any way.

EXAMPLES 1-9

Examples 1-9 demonstrate the synergism between a phosphate fertilizer and an acrylic acid/2-acrylamido methylpropyl sulfonic acid scale inhibitor in terms of crop growth.

Different crops were grown, under control conditions, using a phosphate fertilizer alone and using a phosphate fertilizer in combination with 60/40 AA/AMPS, a copolymer of 60% acrylic acid and 40% 2-acrylamido-2-methylpropyl sulfonic acid, by weight, having a molecular weight of approximately 8200, as determined by low angle light scattering, which is commercially available from Calgon Corporation, Pittsburgh, Pa. The results of Examples 1-9 are shown in Table 1 below.

TABLE 1

| Experiment Number | Crop | Measurement | Fertilizer Only (30 ppm Phosphorous) | AA/AMPS only (75 ppm) | AA/AMPS plus Phosphorous (75 ppm/30 ppm) | Percent[3] Improvement |
|---|---|---|---|---|---|---|
| 1 | Rape | Harvest Weight | .21 g | .04 g | 0.53 g | 152.0 |
| 2 | Soy Beans | Harvest Weight | 2.2 g | 2.2 g | 4.3 g | 95.5 |
| 3 | Alfalfa | Height, 70 days | 10.9 cm | 15.0 cm | 16.1 cm | 47.7 |
| 4 | Wheat | Height, 26 days | 21.1 cm | 19.0 cm | 21.4 cm | 1.4 |
|   |   | and Berries per Head | 14.8 | 5.2 | 15.3 | 3.4 |
| 5 | Seedling Grass | Harvest Weight | 1.72 g | 1.0 g | 2.0 g | 16.3 |
| 6 | Turf | Seed Heads per Flat | 12 | 14 | 58 | 383.3 |
| 7 | Radish (9 treatments) | Harvest Weight | negative | — | negative | — |
| 8[1] | Radish (16 treatments) | Height, 42 days | 4.28 cm | 4.13 cm | 5.53 cm | 29.2 |
| 9[2] | Radish (25 treatments) | Harvest Weight | .43 g | 0.48 g | 1.37 g | 218.6 |

[1]In Experiment 8, 40 ppm of phosphorus fertilizer was used alone and in combination with 75 ppm AA/AMPS.
[2]In Experiment 9, 30 ppm of phosphorus fertilizer was used, alone and in combination with 100 ppm AA/AMPS.
[3]Percent improvement shows increase of AA/AMPS plus phosphorous over phosphorous alone.

EXAMPLES 10-21

In Examples 10-21, the leaching of phosphorous from soil containing different amounts of added phosphate was measured. These tests were conducted at room temperature (23° C.) using distilled water. In each test, 5.0 gms of Hastings, Nebraska soil was suspended in 50.0 mls of distilled water. The resulting suspension was shaken for five minutes using a mechanical shaker and then centrifuged at high speed and filtered to obtain a clear filtrate. Each filtrate was analyzed for phosphorous content using spectrophotometry. Results are shown in Table 2, below.

TABLE 2

Effect of AA/AMPS Concentration of Phosphate Leaching From Soil #1 (Hastings, Nebraska #16)
5.0 gm of Soil in 50.0 ml of Distilled Water

| Example No. | $PO_4^{3-}$ Added As Mg/L 'P' | AA/AMPS Added 'Active' mg/L | $PO_4^{3-}$ Leach As mg/L 'P' | % Increase in P Contents | pH |
|---|---|---|---|---|---|
| 10 | 0 | 0 | 0.50 | — | 6.8 |
| 11 | 0 | 50 | 0.56 | 12 | 6.6 |
| 12 | 0 | 100 | 0.68 | 36 | 6.7 |
| 13 | 0.03 | 0 | 0.50 | — | 6.8 |
| 14 | 0.03 | 50 | 0.93 | 86 | 6.8 |
| 15 | 0.03 | 100 | 0.91 | 82 | 6.8 |
| 16 | 0.30 | 0 | 0.60 | — | 6.8 |

TABLE 2-continued

Effect of AA/AMPS Concentration of Phosphate Leaching
From Soil #1 (Hastings, Nebraska #16)
5.0 gm of Soil in 50.0 ml of Distilled Water

| Example No. | $PO_4^{3-}$ Added As Mg/L 'P' | AA/AMPS Added 'Active' mg/L | $PO_4^{3-}$ Leach As mg/L 'P' | % Increase in P Contents | pH |
|---|---|---|---|---|---|
| 17 | 0.30 | 50 | 0.85 | 42 | 6.7 |
| 18 | 0.30 | 100 | 0.83 | 38 | 6.7 |
| 19 | 0.30 | 0 | 2.35 | — | 6.7 |
| 20 | 3.0 | 50 | 2.60 | 11 | 6.7 |
| 21 | 3.0 | 100 | 2.60 | 11 | 6.7 |

The effect of AA/AMPS Concentration on phosphate leaching from Hastings, Nebraska #16 soil is shown in Table 2. These examples show four different concentrations of added phosphate and three different concentrations of AA/AMPS. The addition of AA/AMPS improved the phosphorous availability in solution by over 80% for 0.03 mg/L added phosphorous from ammonium phosphate. However, as the amount of added phosphorous increased to 3.0 mg/L, the improvement over blank fell to 11%. This behavior is quite normal based on precipitation-equilibrium solubility and threshold-inhibition mechanisms.

EXAMPLES 22-24

In these examples, four soils having varyino sand, silt, clay contents and phosphate adsorption capacities were evaluated for phosphate release. The results are shown in Table 3, below.

TABLE 3

Phosphate Leaching from Different Soils Treated
With AA/AMPS and 3.0 mg/L (as 'P') $PO_4^{3-}$

| | Amount of Phosphate Leaching as mg/L 'P' | | | |
|---|---|---|---|---|
| Concentration of AA/AMPS, Active (mg/L) | Hastings, Neb. #16 Soil #1 | Hagerstown, PA #21-22 Soil #2 | Parcolet, SC #23 Soil #3 | Davidson, VA #25 Soil #4 |
| 0 | 2.35 | 1.92 | 2.23 | 0.05 |
| 50 | 2.60 | 2.23 | 2.28 | 0.13 |
| 100 | 2.60 | 2.38 | 2.46 | 0.15 |
| % Increase | 11 | 24 | 10 | 200 |

Table 3 shows that soil #4 (Davidson, Va. #25) releases the least amount of phosphorous into the aqueous solutions. However, 100 ppm of AA/AMPS enhances its phosphorous release by almost 200%. All other soils also responded to the AA/AMPS addition by releasing 10-25% higher amounts of phosphorous into the aqueous solution.

EXAMPLES 25-30

In these examples, various scale inhibitors were evaluated as phosphate leaching aids, using Hastings, Neb. #16 and Davidson, Va. #25 soils. Results are shown in Table 4, below.

TABLE 4

Phosphate Leaching with Different Additives at 50 mg/L,
In Presence of 30 mg/L (as 'P') $PO_4^{3-}$

| | | Amount of Phosphate Leaching as mg/L 'P' | |
|---|---|---|---|
| Example | Additive | Soil #1 | Soil #4 |
| 25 | Blank | 2.35 | 0.05 |
| 26 | AA/AMPS | 2.60 | 0.13 |
| 27 | PAA[1] | 2.57 | 0.13 |
| 28 | HEDP[2] | 2.80 | 0.15 |
| 29 | AA/AMPS/APEO[3] 60/20/20 | 2.45 | 0.10 |

TABLE 4-continued

Phosphate Leaching with Different Additives at 50 mg/L,
In Presence of 30 mg/L (as 'P') $PO_4^{3-}$

| | | Amount of Phosphate Leaching as mg/L 'P' | |
|---|---|---|---|
| Example | Additive | Soil #1 | Soil #4 |
| 30 | AA/AMPS/HEM5[4] | 2.45 | 0.09 |

1. PAA = polyacrylic acid, having a molecular weight of approximately 4700, as determined by light scattering.
2. HEDP = hydroxyethyledene diphosphonic acid.
3. AA/AMPS/APEO = terpolymer of acrylic acid, 2-acrylamido- 2-methylpropyl sulfonic acid and allyl polyethylene oxide having a molecular weight of approximately 5000-10,000, as determined by intrinsic viscosity. The monomer ratio, by weight, is 60/20/20. APEO is commercially available from Union Carbide Corporation.
4. AA/AMPS/HEM5 = terpolymer of acrylic acid, 2-acrylamido- 2-methylpropyl sulfonic acid and polyethylene glycol mono methacrylate, having a molecular weight of approximately 5,000-10,000, as determined by intrinsic viscosity. The monomer ratio, by weight, is 60/20/20. HEM5 is commercially available from Alcolac Corporation.

Table 4 shows that polyacrylic acid, 1-hydroxyethylidene 1-1-diphosphonic acid (HEDP) and terpolymers containing acrylic acid, 2-acrylamido-2-methylpropylsufonic acid and polyethylene oxides aid in leaching phosphate from soil to an aqueous solution. Though HEDP seems to outperform the other additives evaluated in these tests, it is possible that some phosphorous might have come from the HEDP itself.

What is claimed is:

1. A method of enhancing the efficacy of a phosphate fertilizer, comprising adding to said fertilizer an effective amount of a scale inhibiting compound selected from the group consisting of: hydroxy ethylidene diphosphonic acid, copolymers ofa crylic acid and 2-acrylamido-2-methylpropyl sulfonic acid, copolymers of acrylic acid and 2-methacrylamido-2-methylpropyl sulfonic acid, copolymers of methacrylic acid 2-acrylamido-2-methylpropyl sulfonic acie, copolymers of methacrylic acid 2-methacrylamido-2-methylpropyl sulfonic acid, copolymers of acrylic acid and hydroxy alkyl acrylate, copolymers of methacrylic acid and hydroxy alkyl acrylate, copolymers of acrylic acid and maleic acid or maleic anhydride and copolymers of methacrylic acid and maleic acid or maleic anhydride.

2. The method of claim 1, wherein said scale inhibiting compound is selected from the gorup of polymers consisting of: copolymers of acrylic acid and 2-acrylamido-2-methylpropyl sulfonic acid or 2-methylacrylamido-2-methylpropyl sulfonic acid, wherein the monomer ratio is 1:50 to 50:1, and copolymers of methacrylic acid and 2-acrylamido-2-methylpropyl sulfonic acid or 2-methacrylamido-2-methylpropyl sulfonic acid, wherein the monomer ratio is 50:1 to 1:50.

3. An impoved fertilizing composition, comprising (a) a phosphate fertilizer and (b) a scale inhibiting compound selected from the group consising of: hydroxy ethylidene diphosphonic acid, copolymers of acrylic acid and 2-acrylamido-2-methylpropyl sulfonic acid, copolymers of acrylic acid and 2-methacrylamido-2-methylpropyl sulfonic acid, copolymers of methacrylic acid 2-acrylamido-2-methylpropyl sulfonic acie, copolymers of methacrylic acid 2-methacrylamido-2-methylpropyl sulfonic acid, copolymers of acrylic acid and hydroxy alkyl acrylate, copolymers of methacrylic acid and hydroxy alkyl acrylate, copolymers of acrylic acid and maleic acid or maleic anhydride and copolymers of methacrylic acid and maleic acid or maleic anhydride, wherein the ratio of said fertilizer to said scale inhibiting compound is from 1:1000 to 1,000:1, by weight.

4. The method of claim 1, wherein said scale inhibiting compound is selected from the gorup of polymers consisting of: copolymers of acrylic acid and 2-acrylamido-2-methylpropyl sulfonic acid or 2-methylacrylamido-2-methylpropyl sulfonic acid, wherein the monomer ratio is 1:50 to 50:1, and copolymers of methacrylic acid and 2-acrylamido-2-methylpropyl sulfonic acid or 2-methacrylamido-2-methylpropyl sulfonic acid, wherein the monomer ratio is 50:1 to 1:50.

5. A method of improving the growth of plants comprising adding to the soil in which said plants are growing, separately or in combination, (a) a phosphate fertilizer and (b) a scale inhibiting compound selected from the group consisitn of: hydroxy ethylidene disphosphonic acid, copolymers of arylic acid and 2-acrylamido-2-methylpropyl sulfonic acid, copolymers of acrylic acid and 2-methacrylamido-2-methylpropyl sulfonic acid, copolymers of methacrylic acid 2-acrylamido-2-methylpropyl sulfonic acid, copolymers of methacrylic acid 2-methacrylamido-2-methylpropyl sulfonic acid, copolymers of acrylic acid and hydroxy alkyl acrylate, copolymers of methacrylic acid and hydroxy alkyl acrylate, copolymers of acrylic acid and maleic acid or maleic anhydride and copolymers of methacrylic acid and maleic acid or maleic anhydride, wherein the ratio of said fertilizer to said scale inhibiting compound is from 1:1000 to 1000:1, by weight, wherein at least 0.1 ppm, based on total dry soil weight, of scale inhibitor is added and wherein the ration of scale inhibitor to fertilizer ranges from about 1000:1 to about 1:1000.

6. The method of claim 5, wherein said scale inhibiting compound is selected from the gorup of polymers consisting of: copolymers of acrylic acid and 2-acrylamido-2-methylpropyl sulfonic acid or 2-methylacrylamido-2-methylpropyl sulfonic acid, wherein the monomer ratio is 1:50 to 50:1, and copolymers of methacrylic acid and 2-acrylamido-2-methylpropyl sulfonic acid or 2-methacrylamido-2-methylpropyl sulfonic acid, wherein the monomer ratio is 50:1 to 1:50.

* * * * *